(12) United States Patent
Summersgill et al.

(10) Patent No.: US 6,348,999 B1
(45) Date of Patent: Feb. 19, 2002

(54) MICRO RELIEF ELEMENT AND PREPARATION THEREOF

(75) Inventors: Philip Summersgill; Thomas Grierson Harvey; George Timothy Ryan; Neil Carter, all of Cleveland (GB)

(73) Assignee: Epigem Limited, Middlesbrough (GB)

( * ) Notice: Subject to any disclaimer, the term of this patent is extended or adjusted under 35 U.S.C. 154(b) by 0 days.

(21) Appl. No.: 08/952,569

(22) PCT Filed: May 8, 1996

(86) PCT No.: PCT/GB96/01096

§ 371 Date: Feb. 27, 1998

§ 102(e) Date: Feb. 27, 1998

(87) PCT Pub. No.: WO96/35971

PCT Pub. Date: Nov. 14, 1996

(30) Foreign Application Priority Data

May 10, 1995 (GB) .............................. 9509487

(51) Int. Cl.[7] ................................. G02B 5/18
(52) U.S. Cl. ................ 359/569; 359/572; 359/576
(58) Field of Search ................ 359/569, 572, 359/576, 586, 3

(56) References Cited

U.S. PATENT DOCUMENTS

| 4,395,451 A | 7/1983 | Althouse ............ 428/141 |
| 4,576,850 A | 3/1986 | Martens ............ 428/156 |
| 5,085,514 A | * 2/1992 | Mallik et al. ............ 359/527 |
| 5,155,604 A | * 10/1992 | Miekka et al. ............ 359/572 |
| 5,260,175 A | 11/1993 | Kowanz et al. ............ 430/326 |
| 5,340,637 A | * 8/1994 | Okai et al. ............ 359/569 |
| 5,629,804 A | * 5/1997 | Tomono ............ 359/576 |
| 5,739,952 A | * 4/1998 | Takeda et al. ............ 359/576 |

FOREIGN PATENT DOCUMENTS

| EP | 585836 | 3/1994 |
| JP | 61-273568 | 4/1987 |

OTHER PUBLICATIONS

Becker et al, 1986, Microelectronic Engineering 4: 35–56.
Gale et al. (1978) J. Micrographics 11:155–62.
Gale et al., 1993, Applied Optics 32:2526–33.
Linder et al, 1993, Technisches Mesen TM 1982–1988 Incomplete 60:319–28.
Stern et al, 1992, Proceeding of the SPIE, 1751:85–95.

* cited by examiner

Primary Examiner—Cassandra Spyrou
Assistant Examiner—Jennifer Winstedt
(74) Attorney, Agent, or Firm—Kurt D. Van Tassel; Deborah E. VandenHoff; Van Tassel & Associates (57) ABSTRACT

A micro relief element which comprises
  a) a first layer of a first substrate, the first layer having a receptive surface capable of retaining a relief forming polymer;
  b) an overlay of a desired thickness of the relief forming polymer over the receptive surface; and
  c) at least one relief feature formed from the relief forming polymer and which protrudes above the overlay; structures and elements comprising such micro relief element; micro-optical, micro-fluidic, micro-electrical and micro-chemical applications thereof; and a method and apparatus for the preparation thereof.

10 Claims, 6 Drawing Sheets

MICRO RELIEF ELEMENT AND PREPARATION THEREOF

This invention relates to a micro relief element (MRE) and a method of preparing same.

An MRE, as referred to herein, is a 3-dimensional structure which is formed on the surface of a desired substrate and which structure is able to perform a specific function. Typically, the structure is a repetitive pattern which protrudes above the substrate to a defined height of the order of 0.1 to 1000 microns. Such an MRE can be used as an active component in micro-optic, micro-fluidic, micro-electrical and micro-mechanical devices. In particular, such an MRE can be used as a micro-optical element (MOE) and in which case the structure may be of a height in the range 0.1 to 1000 microns, more commonly in the range 0.1 to 10 microns. Where the MRE is a component in a micro-fluidic or micro-mechanical device then the structures are usually of heights in the range 10 to 1000 microns.

An MOE comprises a surface relief structure whose purpose is to induce phase changes on a light beam which is incident upon the structure such that a predetermined spatial distribution of the light results when the incident light is viewed either in reflection or transmission. MOEs also include structures in which the relief structure is embedded within a light transmissive material, hereinafter an immersed MOE, such as for example an immersed microlens.

MOEs may be used for a variety of applications, such as diffraction gratings, lenses, beam array generators, laser harmonic separators, focusing mirrors and microlens arrays.

Microlens arrays can be used for optical readers, interfaces between laser diodes and optical fibres, diffuser screens, integral photography, 3-d camera and display systems, integrated optical devices and imagebars.

Usually, an MOE is formed by exposing and developing the desired surface relief structure into a photosensitive material coated onto the supporting substrate and then transfering the surface relief structure into the substrate by plasma or chemical etching. The conventional design and fabrication of MOEs is discussed in "Synthetic diffractive elements for optical interconnects", M R Taghizadeh et al, Optical Computing and Processing, Vol 2(4), pp 221–242, 1992; "Two-dimensional array of diffractive microlenses fabricated by thin film deposition", J Jahns et al, Appl Opt, Vol 29(7), 931, 1990; "Continuous-relief diffractive optical elements for two-dimensional array generation", M T Gale et al, Appl Opt, Vol 32(14), 2526, 1993; "Multilevel-grating array generators: fabrication error analysis and experiments", J M Miller et al, Appl Opt, Vol 32(14), 2519, 1993; and "Fabricating binary optics in infrared and visible materials" M B Stern et al, SPIE, Vol 1751, Miniature and micro-optics, pp 85–95, 1992.

Microlens arrays have in the past been produced by different methods as described in "Polymer microlens arrays", P Pantelis and D J McCartney, Pure Appl.Opt., Vol 3, 103 (1994); "The manufacture of microlenses by melting photoresist", D Daley, R F Stevens, M C Hutley and N Davies, Meas. Sci. Technol., Vol 1, 759 (1990); and "Microlens array fabricated in surface relief with high numerical aperture", H W Lau, N Davies, M McCormick, SPIE Vol 1544 Miniature and Micro-optics: Fabrication and System Applications, p178 (1991). Glass microlenses have been made by chemically etching glass, moulding glass, plasma etching glass to produce a surface relief structure.

Polymer microlenses have been produced by melting islands of photoresist or by direct writing photosensitive materials with a laser beam or by directly writing a suitable material with an electron beam or by plasma etching or by moulding.

Unfortunately, conventional methods of fabrication for MREs are limited in the range of substrates that can be used and in the complexity and accuracy of the relief structures that can be formed.

It is an object of the present invention to provide a facile method for producing MREs, in particular MOEs, in a variety of substrates and complexity of designs. An advantage of the present method is that a wide range of heights of surface relief can be produced using the same process. Another advantage is that small lateral features can be successfully reproduced. Additionally, the process may be used to produce large area MREs.

Accordingly in a first aspect the present invention provides a micro relief element which comprises
 a) a first layer of a first substrate, the first layer having a receptive surface capable of retaining a relief forming polymer;
 (b) an overlay of a desired thickness of the relief forming polymer over the receptive surface; and
 (c) at least one relief feature formed from the relief forming polymer and which protrudes above the overlay.

In a second aspect the present invention provides a structure for use as at least part of a micro-optical element, which structure comprises
 (a) a first layer of an optically transmissive first substrate having a first refractive index, the first layer having a receptive surface capable of retaining an optically transmissive relief forming polymer;
 (b) an overlay having an optically insignificant effect, preferably having a maximum thickness of less than 1.5 $\mu$m, of the relief forming polymer over the receptive surface, the relief forming polymer having a second refractive index which is the same as or different from the first refractive index; and
 (c) at least one optically active relief feature formed from the relief forming polymer and which protrudes above the overlay.

In a third aspect of the present invention there is provided an immersed MOE comprising
 3(a) a first layer of an optically transmissive first substrate having a first refractive index, the first layer having a receptive surface capable of retaining an optically transmissive relief forming polymer;
 (b) an overlay having an optically insignificant effect, preferably having a maximum thickness of less than 1.5 $\mu$m, of the relief forming polymer over the receptive surface, the relief forming optically transmissive polymer having a second refractive index which is the same as or different from the first refractive index;
 (c) at least one optically active relief feature formed from the relief forming polymer and which protrudes above the overlay; and
 (d) a second layer of an optically transmissive second substrate having a third refractive index which is superimposed upon the at least one optically active relief feature and wherein not all of the first, second and third refractive indices are the same.

In a fourth aspect of the present invention there is provided a method of preparing a micro relief element which comprises
 a) a first layer of a first substrate, the first layer having a receptive surface capable of retaining a relief forming polymer;
 (b) an overlay of a desired thickness of the relief forming polymer over the receptive surface; and (c) at least one relief feature formed from the relief forming polymer and which protrudes above the overlay which method comprises (a) forming a line of contact between the receptive surface and at least one mould feature formed in a flexible dispensing layer;

(b) applying sufficient of a resin, capable of being cured to form the relief forming polymer, to substantially fill the at least one mould feature, along the line of contact;

(c) progressively contacting the receptive surface with the flexible dispensing layer such that (1) the line of contact moves across the receptive surface;

(2) sufficient of the resin is captured by the mould feature so as to substantially fill the mould feature; and (3) no more than a quantity of resin capable of forming the overlay passes the line of contact;

(d) curing the resin filling the at least one mould feature so as to form the at least one relief feature; and, optionally, thereafter (e) releasing the flexible dispensing layer from the at least one relief feature.

In a fifth aspect of the present invention there is provided a method of preparing a structure for use as at least part of a micro-optical element, which structure comprises (a) a first layer of an optically transmissive first substrate having a first refractive index, the first layer having a receptive surface capable of retaining an optically transmissive relief forming polymer;

(b) an overlay having an optically insignificant effect, preferably having a maximum thickness of less than 1.5 $\mu$m, of the relief forming polymer over the receptive surface, the relief forming polymer having a second refractive index which is the same as or different from the first refractive index; and (c) at least one optically active relief feature formed from the relief forming polymer and which protrudes above the overlay which method comprises (a) forming a line of contact between the receptive surface and at least one mould feature formed in a flexible dispensing layer;

(b) applying sufficient of a resin, capable of being cured to form the relief forming polymer, to substantially fill the at least one mould feature, along the line of contact;

(c) progressively contacting the receptive surface with the flexible dispensing layer such that (1) the line of contact moves across the receptive surface;

(2) sufficient of the resin is captured by the mould feature so as to substantially fill the mould feature; and (3) no more than a quantity of resin capable of forming the overlay passes the line of contact;

(d) curing the resin filling the at least one mould feature so as to form the at least one optically active relief feature; and, optionally, thereafter (e) releasing the flexible dispensing layer from the at least one optically active relief feature.

An MRE of the present invention may be capable of use as an active component in a micro-optic, micro-fluidic, micro-electrical or micro-mechanical device. However, the principle use herein envisaged for an MRE of the present invention is as a micro-optical element (MOE). Reference herein to features making up an MOE according to the invention may be to features which are equally advantageous in other applications of MRE's and references to MOE's will be construed as referring to MRE's accordingly.

Such an MOE may be able to perform more than one optical function, e.g. an MOE for use as a beam corrective optic for diode lasers may combine the functions of astigmatism correction, elipticity correction and beam collimation.

Moreover, the optically active relief feature in combination with the supporting first layer may be able to perform more than one optical function, for example an optically active relief feature supported on a shaped first layer, suitably of lens shape, may provide for correction of chromatic aberration.

Accordingly it will be apparent that the first layer and indeed the MRE or MOE, and the relief feature(s) may be of any desired geometry according to the desired function to be performed. For example the first layer, including an optional support substrate, may be planar, hollow or solid cylindrical, or may comprise a lens or other optical component wherein the relief feature(s) is/are suitably applied to a surface thereof. Alternatively or additionally the relief feature(s) may for example comprise one or more continuous, stepped or otherwise profiled structures such as lens, straight or angled track or lateral, annular ring, straight or curved diffraction grating, multiple faced (pyramidal), or other optical, fluidic, electrical or mechanical structure.

Additionally, the MOE may be coated with an other material in order to protect the MOE (anti-scratch coating) or to reduce reflection from the MOE (anti-reflection coating). Preferably, such coatings are multilayered coatings.

Furthermore, the MOE may function in reflection rather than transmission. This might be achieved by fabricating the MOE using a reflective first layer or by coating the surface of the MOE to enhance reflection from it.

The first layer may be supported by a suitable support substrate which may be subsequently removed from the first layer. However, it is preferred that the first layer is self-supporting or is associated with a support surface of desired geometry for a desired application. Suitably the first layer is comprised of any suitable material for the intended application which may be known in the art for example it may be a polymer film (in particular a film formed from polyester, such as PET or PEN, or an other polymer such as PVC, polyimide, PE or a known biodegradable polymer, e.g. poly(hydroxy butyrate)); a material selected for its optical transparency at certain wavelengths for example ZnSe or Germanium which are capable of operation in the infra-red region between 2 and 15 micron; silicon; high temperature resistant inorganic metal oxide or ceramic such as titania or (fused) silica, e.g. glass; or it may be a natural or synthetic paper product such as a wood pulp or synthetic card or paper.

For certain applications, for example where semiconductor components are mounted onto the MRE and from which it is desirable to dissipate heat, the first layer may be coated with a layer of diamond or similar material with a high thermal conductivity.

Additionally, the first layer may be coated with an electrically conducting layer, e.g. indium tin oxide (ITO) or gold, so that an electrical contact can be made to a semiconductor component located on the surface of the first layer.

The receptive surface of the first layer may be coated with a suitable bonding agent, e.g. where the first layer is of glass, a silane coupling agent, which serves to more firmly anchor the relief feature to the first layer.

Coating of the first layer may be achieved as a continuous layer prior to forming the optically active relief structure(s) thereon, but is advantageously achieved as a layer about the optically active relief structure(s), which may be created by replication from the flexible dispensing layer during the formation of the optically active relief structure(s).

The second layer may also be supported by a suitable, optionally releasable, substrate. The second layer may be superimposed on the at least one optically active relief feature by any suitable means, e.g. lamination. The second layer may also be provided with at least one mould feature in which is moulded an optically transmissive polymer, which may be the same as the optically transmissive relief forming polymer retained on the receptive surface, and which may be so placed that at least some of the mould features of the second layer are matched with at least some of the mould features of the first layer such that they can form a composite optical component.

The selection of the relief forming polymer will be dependent on the intended use of the MRE and includes silica filled, light curable resins such as those used in dentistry and those for rapid prototyping by stereolithography, UV curable liquid crystal resins, photo-cationic epoxy resins and those optically transmissive resins as described below.

When optically transmissive, the relief forming polymer may be selected from those known in the art including those developed as light curable adhesives for joining optical components for example those sold under the name LUX-TRAK (LUXTRAK is a tradename of Zeneca plc), those developed for polymer optical fibre fabrication and those developed for optical recording using polymer photoresists. In particular the optically transmissive relief forming polymer may be formed from a suitable resin for example halogenated and deuterated siloxanes, styrenes, imides, acrylates and methacrylates such as ethyleneglycol dimethacrylate, tetrafluoropropylmethacrylate, pentafluorophenylmethacrylate, tetrachloroethylacrylate, multifunctional derivatives of triazine and phosphazene. Resins and polymers that contain highly fluorinated aliphatic and aromatic moieties are preferred.

Preferably, the optically transmissive relief forming polymer is selected to have as near as possible equal and opposite thermal expansion and thermo-optic coefficients. The advantage of this is that increases in the optical path length (and hence phase change) due to thermal expansion of the material are compensated by decreases in its refractive index. This advantage requires that the optically active relief is restrained from expanding laterally by the effect of the substrate material. This will be the case when the overlayer is small. "Temperature dependence of index of refraction of polymeric waveguides", R Moshrefzadeh, M D Radcliffe, T C Lee and S K Mohapatra, J Lightwave Tech, vol 10 (4), 420 (1992) describes a number of polymer materials having negative thermo-optic coefficients, positive thermal expansion coefficients of the same magnitude. For example, PMMA has a thermo-optic coefficient of $-1.1 \times 10^{-4}$ $K^{-1}$.

Preferably, the optically transmissive polymer has a refractive index which is matched to the first refractive index, e.g. 1.51 at 633 nm when the first layer is Bk7 borosilicate glass or 1.46 at 633 nm when the first layer is quartz.

The refractive index of the optically transmissive relief forming polymer may be modified by the inclusion of suitable additives into the polymer. In particular the refractive index of the polymer may be adjusted by adding appropriate amounts of ethylene glycol dimethacrylate which can increase the refractive index (as measured at 1.32 or 1.55 $\mu$m) by an absolute value in excess of 0.02 when added at a level of 30% by weight.

Furthermore, an error in the depth of the optically active relief features (compared to the designed depth) can be corrected by increasing or decreasing the refractive index of the optically transmissive relief forming polymer by an equal fractional amount.

A further advantage of controlling the refractive index of the optically transmissive relief forming polymer is that the wavelength of operation of the MOE is shifted as a result. Hence a series of MOEs can be produced from the same flexible dispensing layer so as to obtain an MOE which operates at high efficiency at the chosen wavelength. Changing the refractive index from 1.45 to 1.55 for an MOE designed to operate at 633 nm for example would result in maximum efficiency operation at 677 nm.

The overlay of the relief forming polymer is reproducibly controlled to obtain a thickness appropriate to the function of the MRE and may, even in those instances where a minimum overlay is desired, usefully serve to planarise the receptive surface. In some instances, e.g. in micromechanical devices, a relatively thick and uniform overlay may be desirable for example to secure the relief forming polymer firmly to the first layer. In other instances, e.g. where the MRE is an MOE, it is desirable to minimise the thickness of the overlay such that it does not interfere significantly with the optical function of the MOE, i.e. the overlay is optically insignificant. Preferably, the optically insignificant overlay has a maximum thickness of less than 1.5 $\mu$m, preferably less than 1 $\mu$m, and particularly less than 0.5 $\mu$m over the surface of the first substrate. The average thickness of the optically insignificant overlay is preferably less than 1 $\mu$m and particularly less than 0.5 $\mu$m. The variation of the thickness of the overlay, whether optically insignificant or not, across the surface is preferably less than±0.75 $\mu$m, particularly less than±0.5 $\mu$m and especially less than±0.25 $\mu$m. This has the particular advantage of minimising wavefront error.

The optical performance of the MOE depends on the phase difference produced between parts of the light beam which travel through different areas of the surface relief pattern. The phase difference is defined by the product of the depth of the features below the surface of the MOE and the refractive index of the material in which the MOE is produced. An advantage of having less than 1 micron of overlay between the first layer and the optically active relief is that this height is well defined. Hence the MOE functions as designed. Also important is the flatness of the intervening surface between the optically active relief features of the MOE. Improved performance results if the intervening surface is flatter than the wavelength of the light being used. With minimum overlay, the intervening surface is as flat as the first layer on which it is produced. Another advantage of minimum overlay is that it reduces optical loss of the part resulting from absorption of light by the material by minimising the total thickness of material required to define the surface relief pattern.

A very significant advantage of making polymer optically active relief features on glass or another material with a low thermal expansion coefficient is that the thermal stability of the MOE component is enhanced as a result of maintaining the pitch of such optically active relief features and by minimising the volume of that material which has a relatively high thermal expansion coefficient.

In order to facilitate the curing of the resin it is preferred to use an initiator, for example a thermal and/or photoinitiator and particularly an initiator which does not absorb light at the operating wave length of the MOE. Typically, when used, an initiator is present in the resin at a concentration from 0.1 to 3.0% by weight, and preferably from 0.5 to 2.0% by weight. Suitable photoinitiators include 2-methyl-1-[4-(methylthio)phenyl)-2-morpholino propanone-1 (Irgacure 907), 1-hydroxy-cyclohexyl-phenyl ketone (Irgacure184), isopropylthioxanthone (Quantacure ITX), Camphorquinone/dimethylaminoethylmethacrylate. Similarly a suitable thermal initiator is tert-butylperoxy-2-ethyl hexanoate (Interox TBPEH).

As the line of contact moves across the surface of the first layer the resin is effectively pushed across the surface and flows into the at least one mould feature. The rate at which the line of contact advances across the surface will depend, amongst other things, on the characteristics of the resin. Typically, the resin has a viscosity from 0.1 to 100 poise and more typically from 10 to 100 poise.

The resin may be fully retained within a mould feature as the line of contact moves from the mould feature, in which case the resin may be cured at any convenient subsequent time. However, the resin may often show some degree of resilience in the non-cured form in which case as the line of contact moves from the mould feature the resin therein will tend to relax and exude from the mould feature. Where the relief feature is part of an MOE then this relaxation of the resin can reduce the effectiveness of the MOE. To counter the relaxation of the resin it is preferred that the resin is cured before the line of contact completely moves from it.

Conveniently and preferably therefore, the resin contains a photoinitiator which is activated by a particular wavelength of light, particularly UV light. A suitable source of light may then be used to cure the resin before the pressure applied along the line of contact is released and before the resin relaxes from the retaining feature. It is especially preferred that the flexible dispensing layer is transparent to the light used and that the light is shone through the flexible dispensing layer towards the resin. In order to focus the light substantially at the tip and thereby avoiding, for example, premature curing of the resin, the angle of incidence of the light onto the line of contact may be required to be adjusted from polymer to polymer. Alternatively, for a given angle of incidence and where the first layer is at least partially transmissive to the light, the first layer may be chosen to have a thickness such that the internal refraction of the incident light acts to focus the light at the line of contact. Additionally, where the first layer is at least partially transmissive to the light and is of a suitable thickness, a mirrored support may be positioned under the first layer thereby causing the transmitted light to be reflected back to the line of contact.

The pressure is applied along the line of contact by any suitable means. Suitably, the pressure is applied using an advancing bar or flexible blade under a compressive load which may be drawn along the surface, or using a roller under a compressive load which may thus on advancement or rotation retain the resin in the nip formed by the bar, blade or roller between the flexible dispensing layer and the surface. It is therefore preferred that the resin is cured at the nip as the line of contact progresses across the surface.

The flexible dispensing layer is preferably a polymer film into which the mould features have been embossed. Such an embossed film is preferably transparent to UV light, has high quality surface release properties and is capable of remaining dimensionally sound during the moulding process. Conveniently, such an embossed film may be formed by (a) forming a master pattern having a contoured metallised surface which conforms to the required relief structure, (b) electroforming a layer of a first metal onto the metallised surface to form a metal master, (c) releasing the metal master from the master pattern, (d) repeating the electroforming process to form a metal embossing master shim and (e) embossing the relief structure into a polymer film so as to form the desired mould features.

Adventitiously, when transparent, the embossed film may be optically aligned so that the mould features may be precisely aligned on the receptive surface of the first layer. Thus, the mould features may be more easily oriented on the receptive surface, e.g. about a desired axis of or existing feature on the receptive surface. In particular, where the first layer is itself a lens then the optical axis of the lens may be aligned with that of an optically active relief feature formed using the mould features such that the optical performance of the composite component is optimised.

Additionally, the embossed film, if retained on the receptive layer, may serve as a protective layer which can be removed at a later time.

A further advantage of making the MOE by the above method is that the refractive index of the relief forming polymer may be varied so as to improve or modify the optical performance of the MOE. This is also a benefit because optical components with different operating wavelengths can be made from the same master shim.

A further advantage of making the MOE by the above method is that the master pattern can be made by a wide range of available techniques in a wide range of materials and is not limited to being made in a material with good optical properties. For example the original master pattern can be made by direct electron beam patterning of photoresist, conventional photolithography, silicon micromachining (K E Peterson, Proc IEEE, Vol 70, 420 (1982)), laser beam writing (E C Harvey, P T Rumsby, M C Gower, S Mihailov, D Thomas, Excimer lasers for Micromachining, Proc of IEE Colloquium on Microengineering and Optics, February 1994, digest No. 1994/043, paper 1; D W Thomas et al, Laser ablation of electronic materials, European Mat Res Soc Monographs, Vol 4, Ed. E Fogarassy and S Lazare, p221 (1992); H Schmidt, Micromachining by lasers, Conf on Lasers and Electro-optics (CLEO EUROPE 94), Amsterdam, September 1994, Paper CMB1); plasma etching (D L Flamm in Plasma etching—an introduction ed by D M Manos and D L Flamm, Academic Press Inc, London (1989), Chapter 2); and single point diamond turning.

A further advantage of making the MOE by the above method is that the flexible dispensing layer may be treated with any suitable material for any desired purpose, for example a masking or screening medium, a priming medium, or a medium conferring any desired optical, electrical, mechanical or fluid properties, such as ink, seed (catalyst) material, a metal precursor, an electrically conducting (precursor) medium, or a biological culture or the like which may be transferred by contact reproduction to the first layer or the overlayer as desired, for example to selected regions thereof on or about the relief features, using a modification of known techniques for example as described in Appl. Phys. Lett. 68(7), 1022–23

Moreover microlenses comprising relief features having a wide range of aspect ratios, i.e. of height to width ratio, may be produced, for example of aspect ratio up to 20, suitably up to 10 or up to 15 depending on the relief forming polymer and the relief feature shape.

An advantage of fabricating an MOE in the form of a microlens array by the above method is that the shape of the surface of each lens is determined by the mould and not by the fabrication process. This is in contrast with the conventional method of producing microlens arrays which relies on surface tension of a molten material to shape the microlenses. The conventional method limits the maximum radius of curvature of each lens and hence the F-number of the lenses that can be produced. The above method can be used to produce for example aspheric lens shapes which give improved lens performance (less spherical aberration).

A further advantage of fabricating a microlens array by the above method is that a second optically functional surface or diffractive optical element, for example, can be formed on the surface of each of the lenses in the array at the same time as the lens itself is defined by use of a mould having the appropriate surface profile or diffractive structure on its inner surface. Thus a profiled or combined refractive diffractive lens is produced. Such a combined lens performs a similar optical function to an achromatic doublet lens (the combination of a lens of negative dispersion with one with positive dispersion).

A further advantage of the above method is that large areas of micro relief arrays can be produced at once, in particular microlens arrays which are often required for use as display screens. Micro relief arrays may comprise repeating sections of identical or different relief features.

Due to the sub-micron resolution of the above method, microlenses with small diameters and pitches may be produced.

A further advantage of the above method is that a set of substantially identical structures may be produced. These may be used in associated or unassociated arrangement.

In optical systems which use microlens arrays there is sometimes a requirement for an optical element which consists of two identical microlens arrays placed back to back, separated by a fixed distance related to the focal length of the microlens array and with the two arrays aligned relative to one another. An advantage of the above method is that because the same mould can be used to form each array, the two arrays will be identical. Accurate separation of the two arrays can be achieved by controlling the thickness of the intervening first layer and the focal lengths of each array can be adjusted by changing the refractive index of the second array until the distance which separates the arrays is substantially the sum of their focal lengths. Furthermore, because the method can use an optically transparent flexible dispensing layer, the second microlens array can be accurately aligned on the back of the first layer by viewing through the flexible dispensing layer.

The concept and applications of fabricating arrays of light emitting diodes with integrated diffractive microlenses fabricated by a different method has recently been reported in "Arrays of light emitting diodes with integrated diffractive microlenses for board-to-board optical interconnect applications: design, modelling and experimental assessment", B Dhoedt, P D Dobbelaere, J Blondelle, P V Daele, P Demeester, H Neefs, J V Campenhout, R Baets, Conference on Lasers and Electro-Optics (CLEO Europe 94), Amsterdam, 28 August to 2 September, paper CThI64 (1994). The above method may also be used with a transparent embossing film to form MOEs onto the surface of a substrate which already has semiconductor devices which emit or detect light (e.g. laser diodes, light emitting diodes, photodiodes and vertical cavity lasers) such that the MOE features are accurately aligned with the semiconductor devices.

The above method may also be used to produce MREs which are alignment layers for liquid crystal cells. Some types of liquid crystal material, in particular ferroelectric liquid crystals, require alignment layers in the cell to orient the liquid crystal in a certain way. Conventionally, the alignment layer can be produced by physically patterning the glass surface, for example by rubbing the surface in the required direction. Alternatively, a thin layer of a material such as $MgF_2$ is evaporated onto the surface. The purpose of this alignment layer is to align the liquid crystal material with a small tilt relative to the normal to the surface. By varying the angle of evaporation, the angle of the tilt can be varied. The current drawback of this method is that the surface area is limited by the size of the evaporator's chamber. An advantage of the above process is that a larger surface area may be structured using an embossed film prepared from several master shims. Alternatively, alignment structures for liquid crystals may be made for example in the form of a plurality of high aspect ratio MRE's resembling relief "hairs" of the order of 200 nm high and 20 nm wide. Adventitiously, the ability to minimise the overlay is that there is less material covering the electrode which is used to apply an electric field to the liquid crystal cell thereby potentially resulting in lower switching powers.

The present invention is illustrated in non-limiting manner by reference to the following figures.

FIG. 3b shows a part of the MOE produced from the flexible dispensing layer prepared using the nickel shim shown in FIG. 3a.

Figure 1:
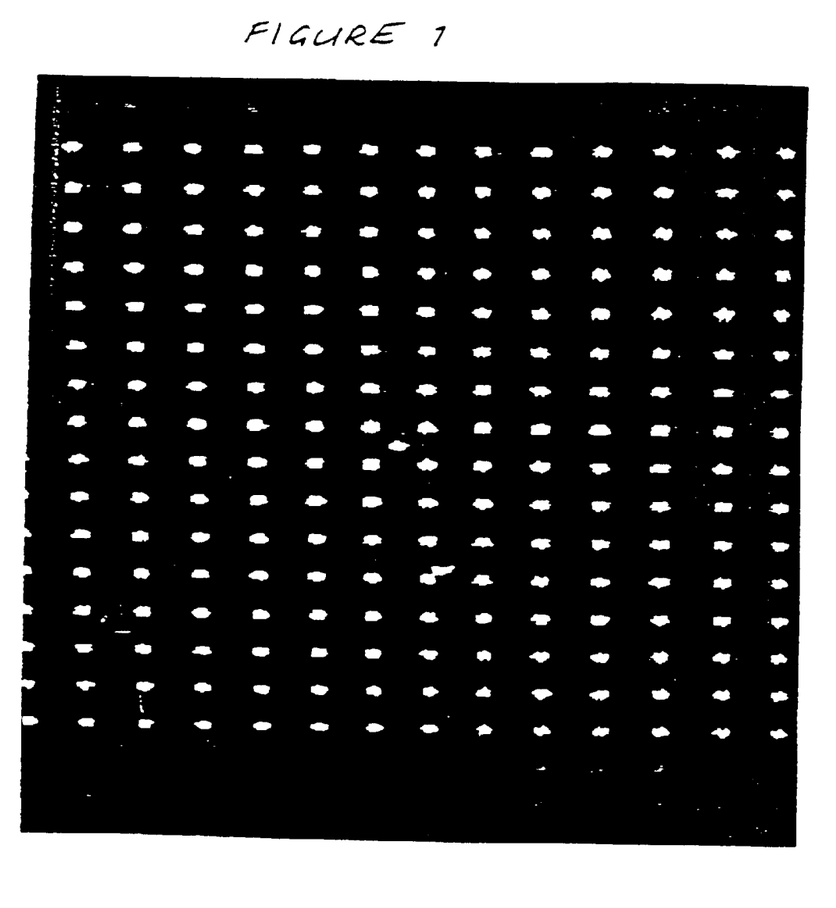
FIG. 1 shows a section of the image produced by a 16×16 MOE beam array generator.

FIG. 1 was produced from an MOE described in Example A.

Figure 2:
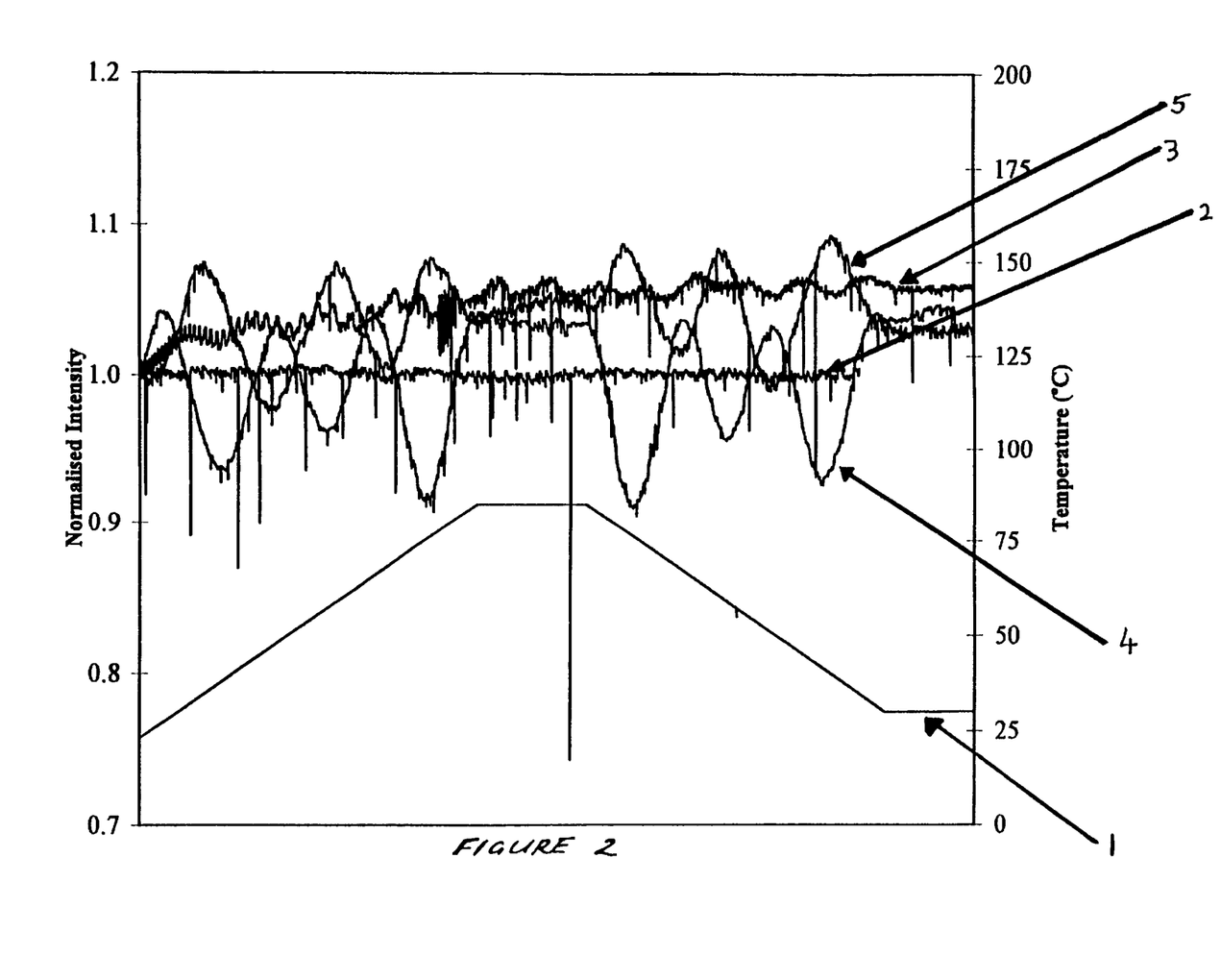
FIG. 2 shows the variation in intensity with temperature for a 4×4 beam array generator.

In FIG. 2, line (1) represents the variation in temperature that the 4×4 beam array generator underwent as described in Example A. Line (2) represents the optical response of the equipment without any sample being present. Line (3) represents the optical response of the MOE fabricated on glass. Line (4) represents the optical response of the MOE fabricated on film. Line (5) represents the optical response when an area of PET film with no MOE on it was illuminated.

Figure 3A:
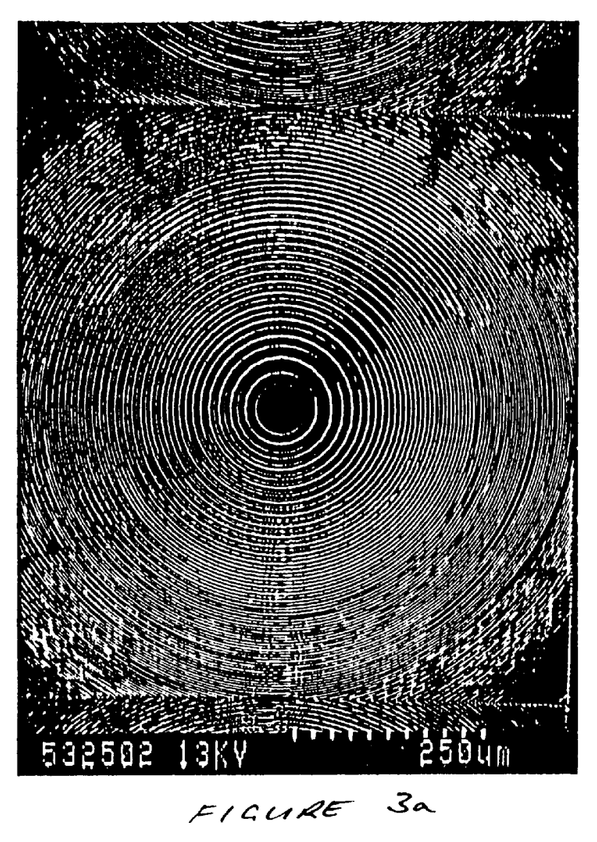
FIG. 3a shows a part of a nickel shim for preparing mould features in a flexible dispensing layer to be used to produce an MOE.

FIG. 3a shows part of a nickel shim as used in Example B.

Figure 3B:
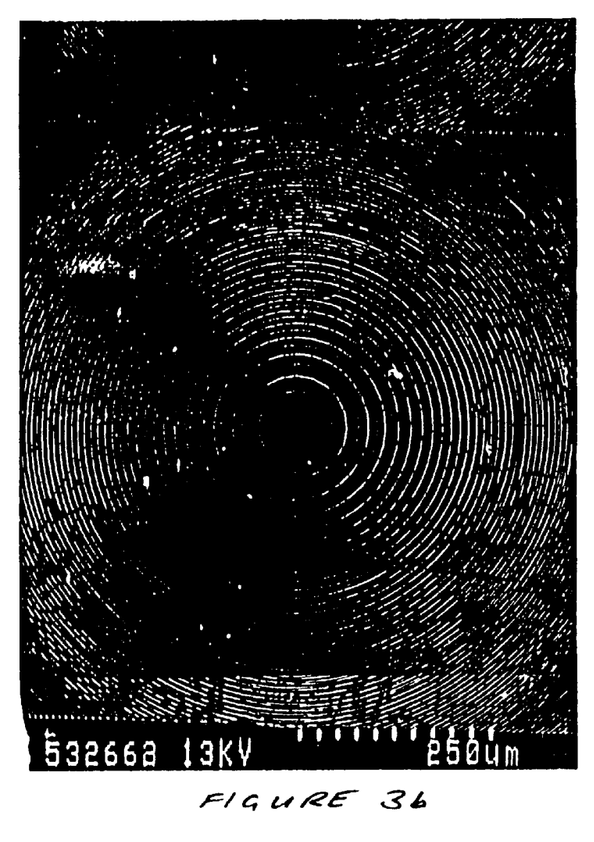

FIG. 3b shows part of microlens array produced according to Example B from a flexible dispensing layer in which the mould features had been formed using the nickel shim shown in FIG. 3a.

Figure 4A:
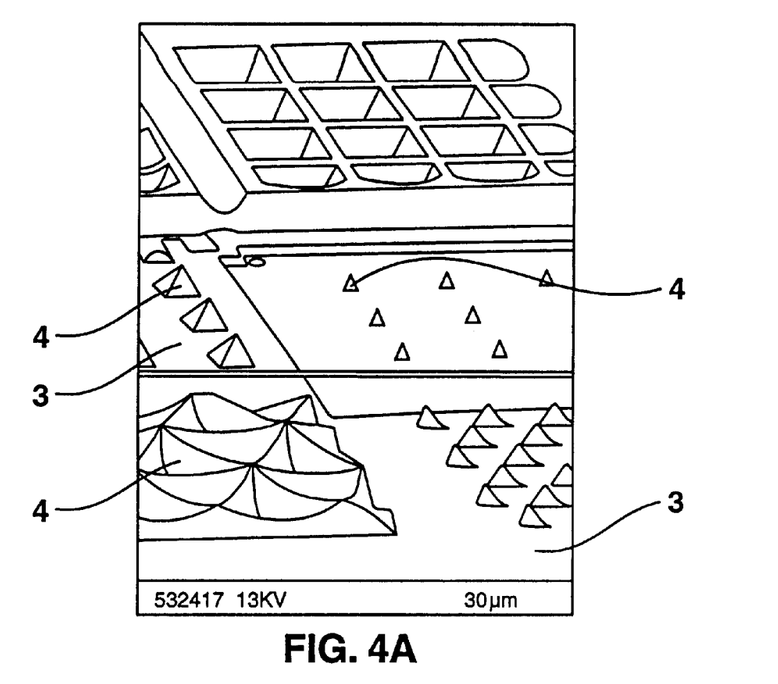
FIGS. 4a and 4b are SEMs showing a variety of surface reliefs.
Figure 4B:
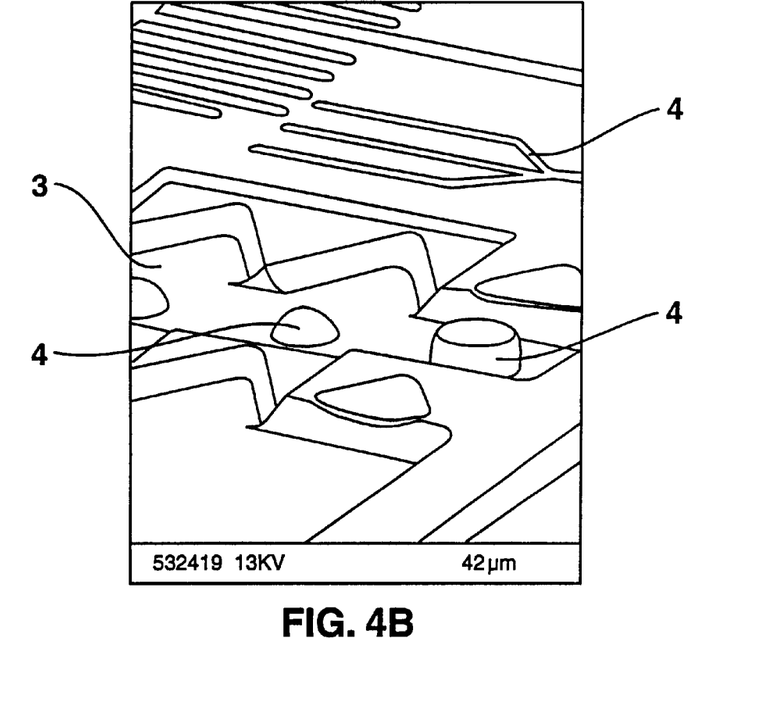

FIGS. 4a and 4b show the various MREs produced in Example D.

Figure 5:
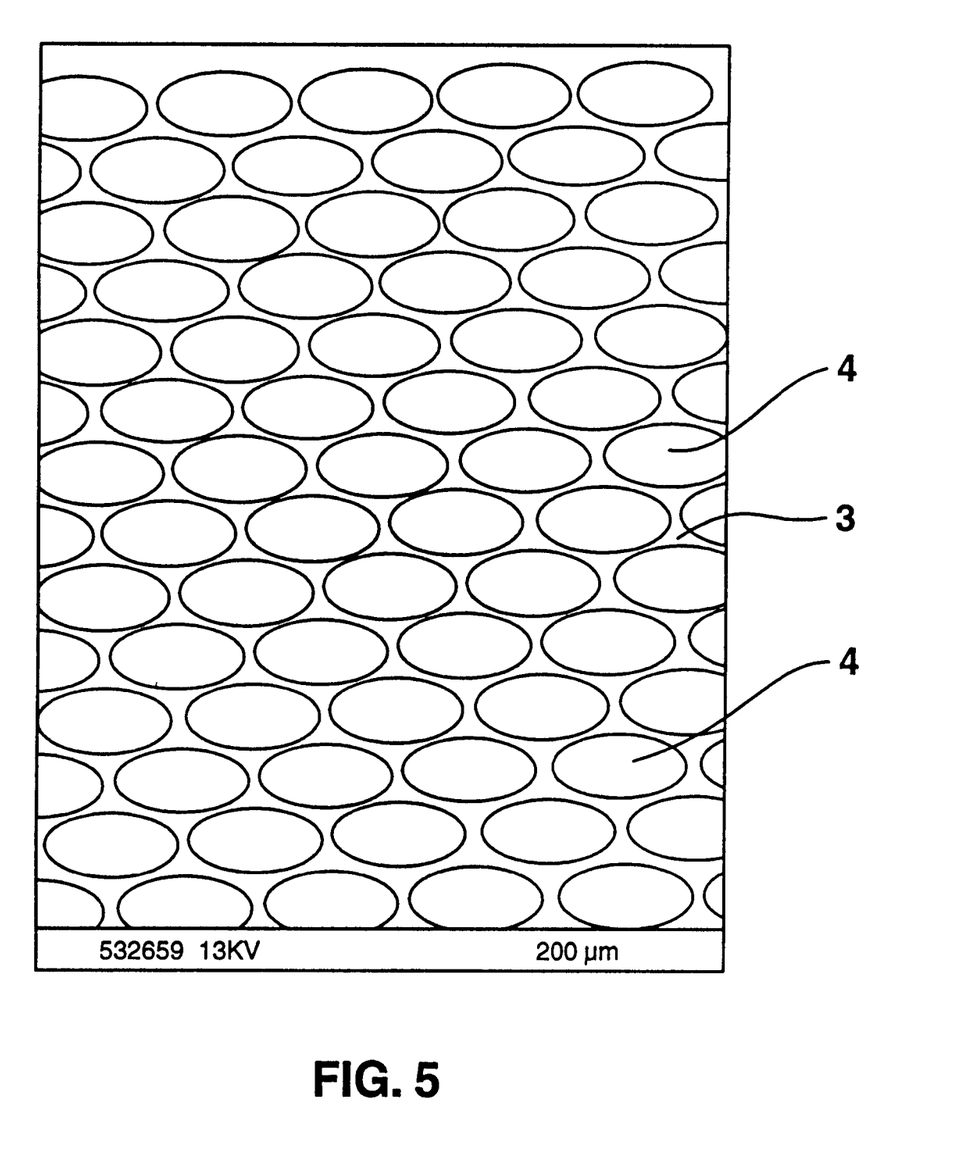
FIG. 5 is an SEM of a relief feature in the form of a microlens array.

FIG. 5 shows a hexagonal microlens array of 125 micron pitch and 204 micron focal length in air as produced in Example E.

Figure 6:
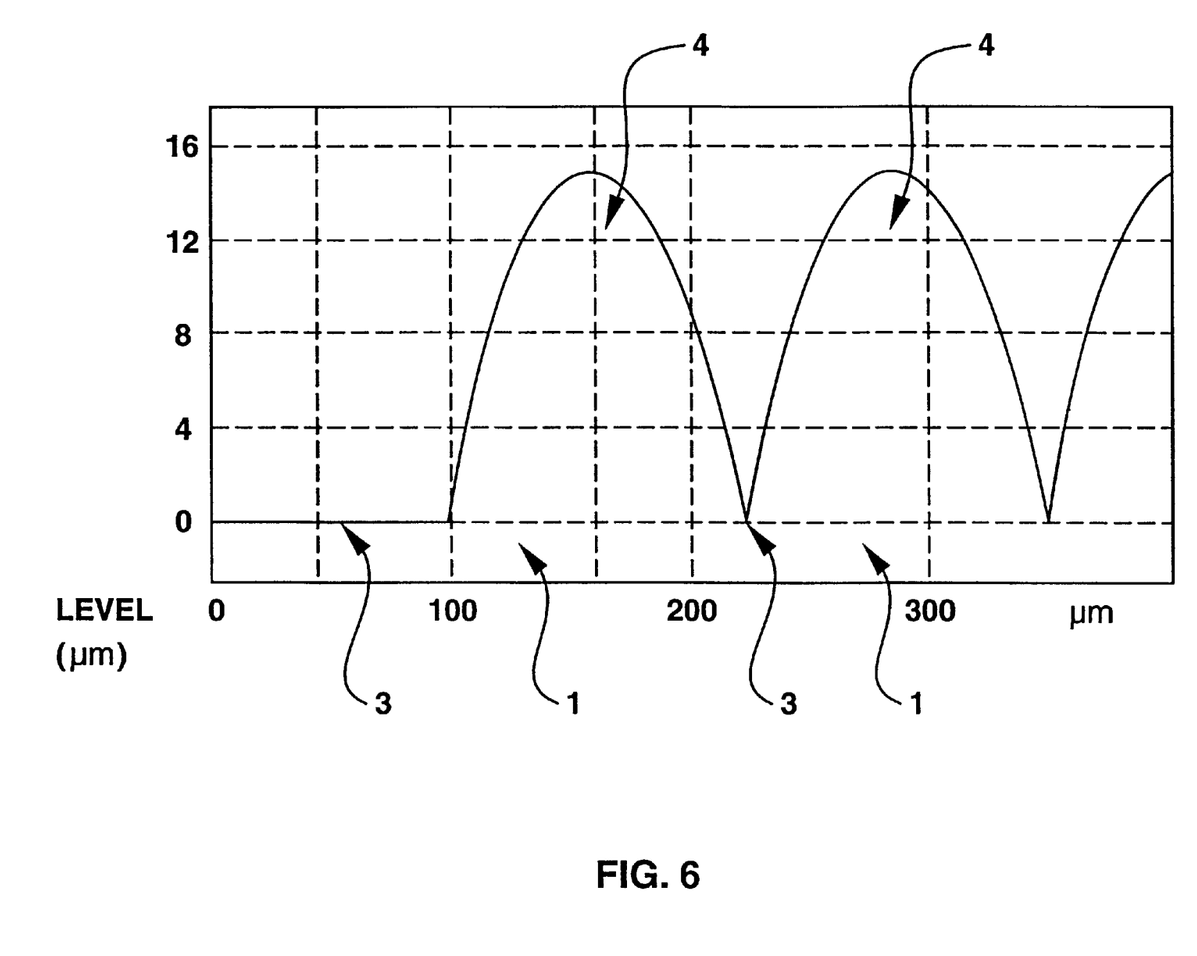
FIG. 6 is Tencor Alpha-step surface profiling machine trace showing overlayer thickness of an MOE.

FIG. 6 was produced from an MOE described in Example F. In region (1) the polymer film was removed from the glass to provide a reference level.

The present invention is further illustrated in non-limiting manner by reference to the following examples.

Preparation of a Flexible Dispensing Layer in the Form of an Embossed Film

EXAMPLE 1.1

The following example describes the preparation of an embossed polymer film having a release treated surface.

A wet coating of neat fluorinated dimethacrylate resin thickness 20 μm was applied to a 100 μm thick polyester substrate (Melinex grade 506). The coating was partially cured by exposing it to UV irradiation for 2 s (whilst in air) from a Fisons F300 ultra violet lamp system delivering 300W/inch.

The coated polyester was then fed into a nip between a 400 mm diameter steel roller which carried a nickel embossing shim containing surface relief microstructures (e.g. 125 μm pitch microlens arrays) and a 150 mm diameter roller faced with silicone rubber of hardness 70 shore. The coated polyester entered the nip such that the coated side was loaded against the shim. The nip load was controlled to 159 kg (350 lb) over a face width of 400 mm. The speed of the 400 mm diameter drum was set to 3.3 cm.s$^{-1}$.

On exiting the nip, the coated polyester and nickel shim passed through a UV source as described above which fully cured the coating whilst in contact with the shim to form the embossed polymer film. The embossed film was then stripped away from the nickel shim and was then baked at 80° C. for 16 hours in an oven.

A release layer of release material, Freekote FRP (Dexter Corporation), was applied to the embossed film by washing with a solution of release material and then drying with compressed air. This process was repeated four times.

EXAMPLE 1.2

The following example describes the preparation of an embossed film which contains an internal release material.

A wet coat of 20 μm was applied to 100 μm polyester substrate (Melinex grade 506) from the following formulation:

97.5 parts Ebercryl 150 (epoxy acrylate ex UCB Ltd.)

2.5 parts Ebercryl 350 (silicone acrylate ex UCB Ltd.)

20 parts LG156 (PMMA)

2 parts Irgacure 651 mixed in solution 20% w/w in MEK. This resulted in a dry thickness of 20 μm.

This coated substrate was processed in the same way as described in the Example 1.1, apart from the baking and the subsequent application of a release material.

EXAMPLE 2.1

The following example describes the preparation of MREs on a rigid substrate using the previously prepared embossed film according to Example 1.1.

A rigid glass substrate was prepared by washing thoroughly in a 30% Dekon 90 solution in water, a hot water rinse, an acetone wash and finally a wash with isopropanol. The substrate was then dried in an oven at 150° C. for 15 minutes.

The substrate was then positioned on a flat assembly bed and secured by vacuum.

The assembly bed was provided with the means to traverse a 75 mm diameter rubber covered nip roller along the length of the assembly bed, which forms an advancing nip region into which a UV source was focused.

An embossed film as described in Example 1.1 was placed face down on top of the glass substrate and anchored at one end with a single sided adhesive tape.

A quantity of resin (LUXTRAK 0208), sufficient to fill the mould features in the embossed polymer was placed between the glass substrate and the embossed polymer as a bead across the direction of travel of the assembly bed and at the anchored end of the embossed film. The traversing roller was then positioned 3 mm before the bead of resin and had a downward load of 40 kg across a face width of 80 mm applied.

The UV source was powered up and the nip roller was advanced at the rate of 1 cm.s$^{-1}$ along the assembly bed across the embossed film/glass substrate. The resin was squeezed into the mould features and was cured by the UV source. After curing the embossed polymer was peeled away leaving the cured resin affixed to the glass substrate. 100% transfer was achieved although some witness marks of residual release material were apparent.

EXAMPLE 2.2

The Example of 2.1 was repeated using the embossed film as prepared in Example 1.2, the LUXTRAK resin as described in Example 2.1 and a fluorinated dimethacrylate resin of formulation:

Fluorodimethacrylate: 97 wt %

Photoinitiator (Irgacure 651): 2 wt %

Thermal initiator (Interox TBPEH): 1 wt %

100% transfer was achieved for the LUXTRAK resin and about 80–90% for the fluoropolymer resin. There were no witness marks apparent.

EXAMPLE A

Using the method as described in Example 2.2, a number of synthetic MOEs, traditionally known as computer generated holograms, were fabricated to a depth 0.6 micron and a smallest lateral dimension of 1.5 micron in LUXTRAK LCR 0208 on a glass substrate.

The chosen MOE was designed to produce an array of spots of nearly equal optical power in the far-field behind the element when it was illuminated with a laser beam of wavelength 670 nm. The laser beam was derived from a diode laser but could have been produced by another type of laser source.

The fabrication of the master pattern was as described in "Synthetic diffractive elements for optical interconnects", M R Taghizadeh and J Turunen, Optical Computing and Processing, vol 2 (4), p221–242, 1992. It consisted of a binary (2 level) surface relief structure produced in a quartz wafer. The diameter of the wafer was large enough to allow 12 MOEs, each of size 15 mm by 15 mm to be defined onto the one wafer surface. The surface of the quartz master was rendered conducting by evaporating on a 10 nm thick layer of chromium followed by a 60 nm thick layer of silver. A nickel shim was then grown from the quartz master by an electroforming process.

The functions of each of the MOEs produced were 2×2, 4×2, 4×4, 8×8, 8×16, 16×16 and 16×32 beam array generators. FIG. 1 shows the pattern produced when the 16×16 MOE was illuminated by the beam from a diode laser at a wavelength of 676 nm. This image was captured using a Electrophysics Microviewer vidicon camera connected to an image capture system.

The intensity of one of the beams in the first order diffraction pattern of a 4×4 beam array generator MOE fabricated in LUXTRAK LCR 0208 resin on a glass substrate as a function of temperature was compared to that of the same MOE fabricated in urethane acrylate (Harcoss resin 6217) on a "Melinex" film substrate. FIG. 2 shows the results of this experiment. The diffracted beam from the MOE fabricated on the film varied by up to 10% over the temperature range 25° C. to 85° C. In comparison, the diffracted beam from the MOE fabricated on the glass varied by only a few percent. A large variation was also observed when the beam passed through the film but outside of the patterned area. This indicates that the thermal mechanical behaviour of the substrate has a strong effect on the performance of the MOE.

EXAMPLE B

Example A was repeated except that the MOE fabricated acted as a microlens array. In this example, the original master was produced by direct electron beam writing of photoresist followed by dry etching of the pattern into quartz. The MOE contained 16 levels of surface relief (16 phase levels) so as to approximate more exactly a continuous surface profile. The advantage of this is that the optical efficiency of the MOE is higher than the equivalent binary phase MOE. As a result of the extra phase levels the smallest lateral feature size in the surface relief was about 200 nm. This is significantly less than the smallest lateral feature size on the binary surface relief. The UV embossing process used to manufacture the MOEs has the capability to reproduce accurately the very small features required. This is a significant advantage over other types of embossing methods (e.g. hot roll embossing or injection moulding). FIG. 3 shows for comparison an 800 micron aperture microlens on the nickel shim and the same lens formed in 2 micron thick urethane acrylate resin (Harcross 6217) on 100 micron thick ICI Melinex film.

EXAMPLE C

Example A was repeated except that the Micro-Optical Element (MOE) fabricated was a surface relief diffraction grating of period 1.1 µm (smallest feature size 0.55 µm) and depth 130 nm. The grating pattern consisted of an annulus of about 30 mm diameter and about 2 mm width. The surface of the MOE was coated with 70 nm of Aluminium by evaporation so as to render it highly reflective. The surface of the grating was illuminated through the glass substrate using light from a He—Ne laser at 633 nm. The irradiance of light reflected from the grating into one of the first diffraction orders was measured and compared to the amount of light reflected from an adjacent metallised area on the MOE where no grating was present. This ratio, also known as the efficiency, was found to be 39±0.5%. The experiment was repeated using two other samples manufactured in the same way. Their diffraction efficiencies were measured to be 39±0.5% and 37±0.5% respectively. The efficiency is directly related to the accuracy with which the replication process reproduces the period and depth of the grating structure. Poor replication of the surface relief results in efficiencies of less than 10%.

The thickness of the overlayer was measured using a Tencor Alpha-step surface profiling machine. The thickness was found to be 0.5 µm.

The experiment was repeated with the same grating pattern but using a piece of the internal release coated "polymer shim" (described in example 1.2) used in the manufacture of the replica on glass (i.e. the previous sample). Once again the sample was arranged so as to read out through the substrate. The diffraction efficiency was measured to be 37%.

This experiment shows that there is no measurable reduction in efficiency due to the use of the polymer shim intermediate.

The experiment was repeated with the same grating pattern but using a sample manufactured by coating a 2 µm thick coating of urethane acrylate (Harcross 6217) onto 175 µm thick PET film (ICI MELINEX) and UV embossing. The diffraction efficiency was measured to be 36±0.5%. This experiment shows that there is no reduction in efficiency by formulating the polymer shim material so as to contain an internal release agent.

The experiment was repeated with the same grating pattern but using 0.5 mm thick polycarbonate sheet (LEXAN) as the substrate. The diffraction efficiency was measured to be 36±0.5%. This experiment shows that alternative rigid substrate materials can be used and that there is no significant reduction in efficiency from the resultant parts.

In all of the experiments above, the efficiency of the MOE produced in this example is significantly larger than that measured from the same surface relief grating structure manufactured from the same master nickel shim by comparative techniques of hot embossing (efficiency 11%) and injection moulding (efficiency 4%).

EXAMPLE D

Using the method previously described in Example 1.1 an embossed film with a number of continuous surface relief microstructures was fabricated. The structures included 12 micron high staircases, pyramids of varying size, grooves, tracks, slopes, hemispherical structures and wells. FIG. 4 shows an SEM photograph of some of the structures formed according to Example 2.2 as LUXTRAK LCR 0208 on glass. Being able to prepare such deep relief features is an advantage because more phase information can be impressed onto light which diffracts from it and hence the optical function of the relief features are enhanced. As shown in FIGS. 4A and 4B, the relief features 4 protrude from the overlay 3.

EXAMPLE E

A nickel embossing shim was made by the following method:

A 100 mm square piece of glass was cleaned and dried. The glass substrate was placed in a vapour bath of Shipley Microposit primer solution for 2 minutes to improve the adhesion of the subsequent photoresist layer. AZ4562 photoresist was spin coated onto the glass substrate at a speed of 2000 rpm for 20 s and the sample softbaked for 10 minutes at 90° C. on a hotplate. The thickness of the photoresist layer was measured to be 9.9 micron using a Tencor alpha-step machine. The sample was exposed for 35 s by contact through a photomask containing a pattern of 125 micron pitch microlenses of diameter 120 microns. The resist image was developed for 7.5 minutes in a 1:4 mixture of AZ developer solution and water. The exposure and development conditions were chosen to ensure that all the photoresist had been removed between each microlens island. Finally, the microlenses were formed by placing the sample onto a hotplate at 15° C. for 45 s. By so doing, the resist material was caused to melt and surface tension drew the resist islands into hemispherical microlenses.

The surface of the microlens sample was rendered conducting by evaporating thin chromium and silver layers onto it. A nickel master was then electroformed from the sample. The nickel master was used to grow an embossing shim which was used to produce an embossed film as described previously.

Using the laminating method previously described, a micro-optical lens array as shown in FIG. 5 was fabricated on a 2 mm thick glass substrate using fluorinated dimethacrylate resin. As shown in FIG. 5, the lenses are relief features 4 which protrude from the overlay 3.

EXAMPLE F

A microlens array was fabricated on a 1.1 mm thick borosilicate glass substrate (B270 glass) using the embossing shim whose preparation was described in example E. The material used was Luxtrax LCR 0208 UV cure acrylate resin. The optical properties of the resin on glass replica were measured so as to compare its optical performance to that of the original melted photoresist lenses. The focal length over the 70 mm by 70 mm area of the microlenses was found to be 204.4 µm with a standard deviation of 1.5 µm. The Strehl ratio was measured to be 0.82 (a Strehl ratio of 1 indicates diffraction limited performance). The lens shape was found to show only 0.55 of a wavelength deviation from spherical when illuminated with light at 633 nm. These parameters are comparable to those measured for similar melted photoresist microlenses, showing that the aberrations are introduced not during the replication process, but are faithfully reproduced from aberrations present in the melted photoresist microlenses.

The thickness of the overlayer on this sample was measured using a Tencor Alpha-step surface profiling machine. The trace obtained is shown in FIG. 6. The thickness was found to be less than 0.4 µm. (Note the relief structure height returns to the level which is bare glass (polymer has been removed to glass for reference purpose adjacent the boundary relief structure)). As shown in FIG. 6, the bare glass is the substrate 1, the overlay 3 is a thin layer of polymer on the substrate 1, and the relief features 4 are the lenses.

EXAMPLE G

The Nickel embossing shim and method described in example E was used to fabricate microlenses on the planar side of 25 mm diameter plano-convex glass lenses. In order to locate the lenses stably during the embossing/laminating process, they were mounted in an array in a polypropylene mounting plate with recesses machined into it using a tool of the same radius of curvature as the lenses. The use of the transparent polymer shim enabled the embossed pattern to be accurately centred on the individual lenses. A further advantage of this method is that the resultant part does not require any further cutting.

EXAMPLE H

The method described in Example E was used to fabricate a microlens array on a 300 µm thick glass substrate. A substrate of this thickness was chosen so that the focal plane of the microlens array would coincide with the back surface of the glass substrate. The focal length of the lens array in glass is equal to the focal length in air (204 µm) multiplied by the refractive index of the substrate (approx 1.5 in this case). Small changes in the focal length could have been made by changing the refractive index of the polymer resin by adding an index modifier to the formulation. However, this was not required in this example as the focal length in glass was approx 300 µm.

Two samples were made and the lens arrays placed so that their uncoated sides were in contact. Upon aligning the arrays so that the microlenses were overlayed on top of each other, the combined lens arrays acted as a 1:1 relay lens and were able to image objects placed beneath them.

Thin glass is difficult to handle and breaks easily therefore it would be difficult to have achieved this example by using a process which requires a high load.

EXAMPLE I

A microlens array was prepared in the same way as detailed in Example E. The microlens array was then positioned on a flat assembly bed and secured by vacuum such that the microlenses were on the top surface. The assembly bed was provided with the means to traverse a 75 mm diameter rubber covered nip roller along the length of the assembly bed, forming an advancing nip region into which a UV source could be focused.

A polyester laminating substrate, "Melinex" grade 400, was placed on top of the microlenses and anchored at one end with a single sided adhesive tape. A quantity of resin with a different refractive index, in this case a fluorodimethacrylate with 25 wt % added ethylene glycol di-methacrylate, sufficient to encapsulate the microlenses, was placed between the microlenses and the polyester laminating substrate in a bead across the direction of travel of the assembly bed and at the anchored end of the laminate.

The traversing roller was then positioned 3 mm in front of the bead of resin and a downward load of 40 kg applied across a face width of 80 mm. The UV source was switched on and the nip roller advanced at the rate of 0.6 m.minute$^{-1}$ along the assembly bed across the laminate. The resin filled the cavities formed between the microlenses and laminating substrate and was cured by the UV source. After curing the laminating substrate was peeled away.

The purpose of this operation was to immerse the microlenses in the higher index material so as to increase the focal length of the microlenses compared to their focal length in air.

EXAMPLE J

An embossed film carrying a 500 micron pitch microlens array was prepared using the method described in Example 1.1. The nickel embossing shim was selected to be a male so that the embossed film was female. The embossed film was coated with ink so that ink was transferred to the intervening, areas extending between the mould features. The embossed film was then used to prepare the microlenses as before. At the same time as forming the microlenses on the glass substrate, ink was transferred to the unoccupied glass surface between the microlenses.

The advantage of this process is that cross-talk between the microlenses is reduced when the lenses are used in an optical system.

What is claimed is:

1. A composite micro relief element for use in micro-optical, micro-fluidic, micro-electrical, micro mechanical or micro-chemical applications which comprises
    (a) a first layer of a first substrate, the first layer having a receptive surface; and
    (b) a layer of a relief forming polymer which is retained on the receptive surface of the first layer, wherein the layer of relief forming polymer comprises overlay and at least one relief feature portions; wherein the overlay is affixed to the receptive surface, serves to planarise the receptive surface, and has a thickness variation less than +/−0.75 µm;
    and wherein the least one relief feature protrudes above the overlay.

2. A micro-relief element according to claim 1 which is a micro-optical element, wherein
    (a) the first substrate is optically transmissive, having a first refractive index;
    (b) the relief forming polymer is optically transmissive and has a second refractive index which is the same as or different from the first refractive index, and the overlay has an optically insignificant effect having a maximum thickness of less than 1.5 µm; and (c) the at least one relief feature is optically active.

3. A composite micro relief element according to claim 1 which comprises additionally (d) a second layer of an optically transmissive second substrate having a third refractive index which is superimposed upon the at least one optically active relief feature and wherein not all of the first, second and third refractive indices are the same.

4. A composite micro relief element according to claim 3, wherein the second layer is provided with at least one mold feature.

5. A micro relief element according to claim 1 which comprises additionally a support substrate which is associated with and supports the first layer.

6. A composite micro relief element according to claim 1 wherein the receptive surface of the first layer and/or the overlay comprises a coating of an agent or material selected or adapted to confer bonding, internal release, anti-reflection, heat dissipation, thermal expansion, thermo-optic, electrically conducting, optically modifying, and/or reflection properties.

7. A composite micro relief element according to claim 1 which is a large area micro relief array, wherein said at least one relief feature which protrudes above the overlay comprises a plurality of relief features.

8. A micro relief element according to claim 7 comprising repeating sections of identical or different relief features.

9. A composite micro relief element according to claim 1 wherein said at least one relief feature which protrudes above the overlay comprises one or more continuous, stepped or other wise optical, fluidic, electrical or mechanical structures and wherein said at least one relief feature has an aspect ratio of up to 20.

10. A set of micro relief elements comprising a plurality of elements as defined in claim 1 which are substantially identical, and are in associated or unassociated arrangement.

* * * * *